United States Patent [19]

Short et al.

[11] Patent Number: 5,380,058
[45] Date of Patent: Jan. 10, 1995

[54] HOLD COVER FOR A VEHICLE ESPECIALLY ONE FOR TRANSPORTING PARTICULATE MATTER

[75] Inventors: Rodney A. Short; Daniel T. Dunn, both of Decatur, Ill.; John D. Cook, Foley, Mo.; William O. Boyd, Collinsville, Ill.

[73] Assignee: Archer Daniels Midland Company, Ill.

[21] Appl. No.: 44,635

[22] Filed: Apr. 8, 1993

[51] Int. Cl.6 .................... B60P 7/04; B63B 19/21
[52] U.S. Cl. ........................ 296/98; 114/361; 114/201 R; 160/243
[58] Field of Search .............. 296/98, 100; 114/26, 114/361, 201 R, 201 R, 202; 160/242, 243, 246

[56] References Cited

U.S. PATENT DOCUMENTS

| | | | |
|---|---|---|---|
| 3,273,171 | 9/1966 | Lamb | 242/86.52 X |
| 3,478,980 | 11/1969 | Raasch | 242/86.52 |
| 3,800,723 | 4/1974 | Collins | 114/26 |
| 4,023,857 | 5/1977 | Killion | 296/98 |
| 4,130,125 | 12/1978 | Nivin | 114/201 R |
| 4,302,043 | 11/1981 | Dimmer et al. | 296/98 |
| 4,341,416 | 7/1982 | Richard | 296/98 |
| 4,874,196 | 10/1989 | Goldstein et al. | 296/98 |
| 4,915,439 | 4/1990 | Cramaro | 296/98 |

*Primary Examiner*—Dennis H. Pedder
*Attorney, Agent, or Firm*—Laff, Whitesel, Conte & Saret, Ltd.

[57] ABSTRACT

A barge cover is wound on a roller, mounted on a trolley which may be moved from one end to the other end of a barge hold, deploying or taking up the cover as it moves. The cover may then be sealed around the barge coaming in a weather proof manner. The roller is mounted on trolleys so that two men may deploy or take up the cover with only their muscle power, without requiring either special docking facilities or an independent power source.

14 Claims, 4 Drawing Sheets

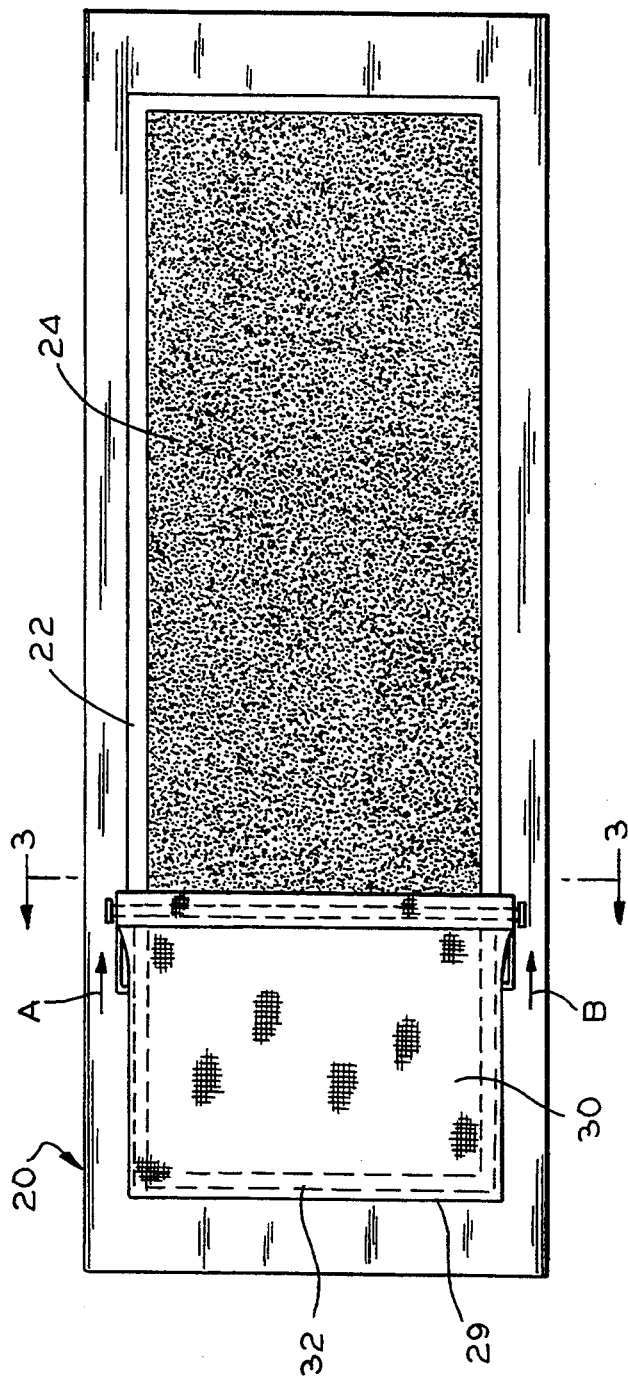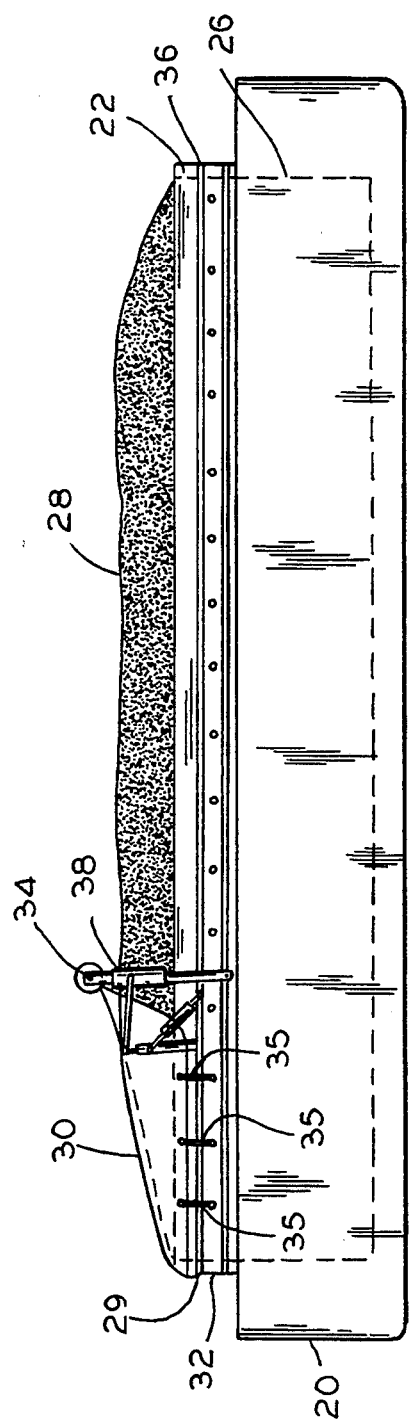

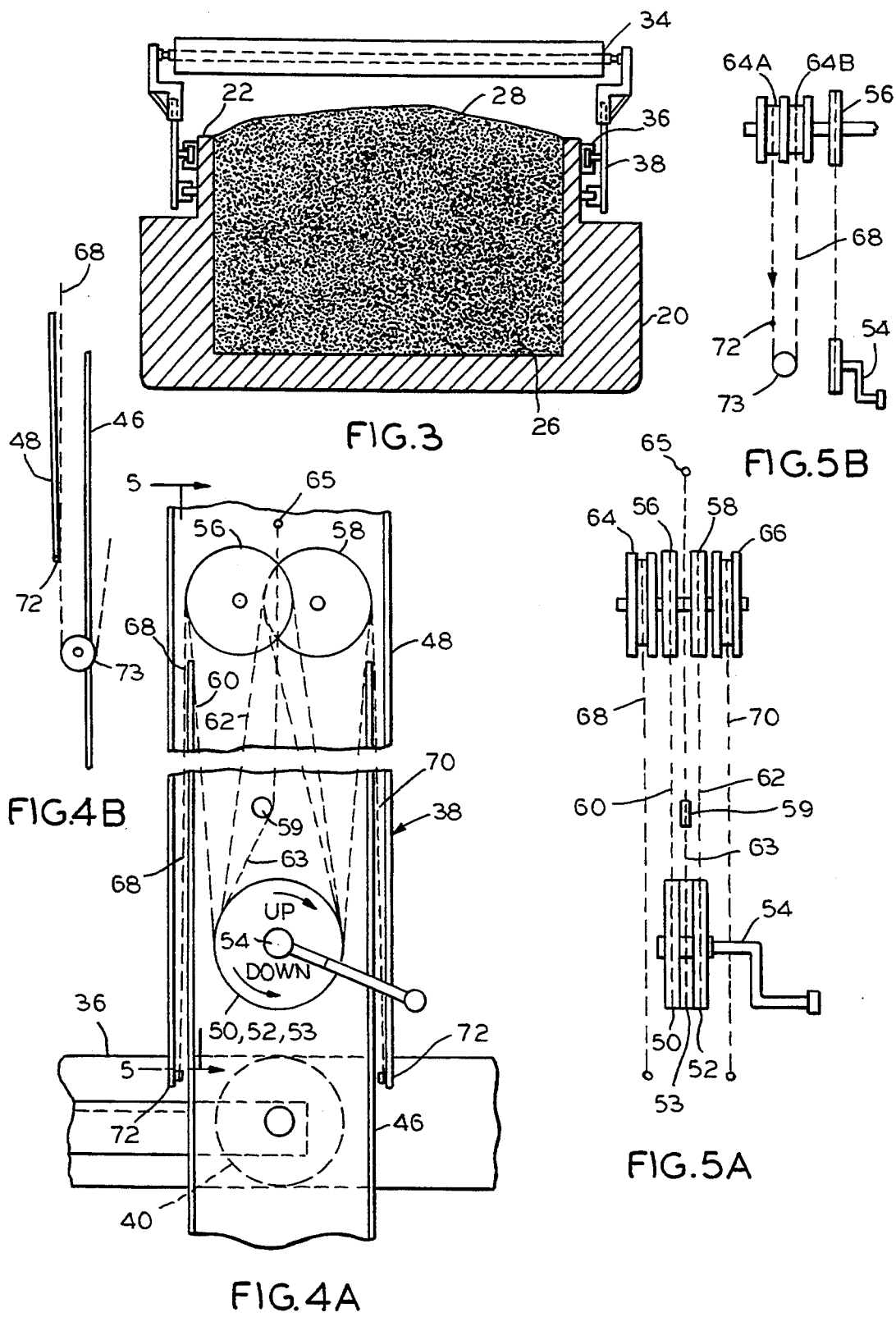

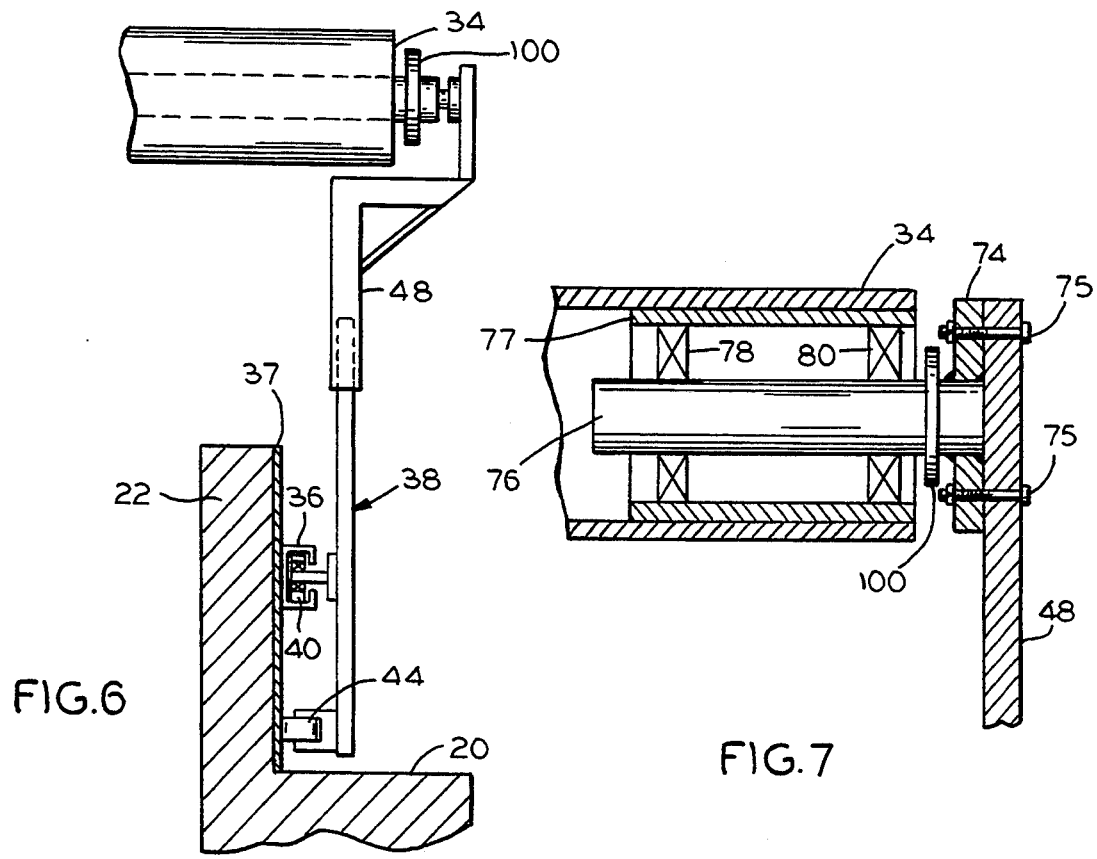
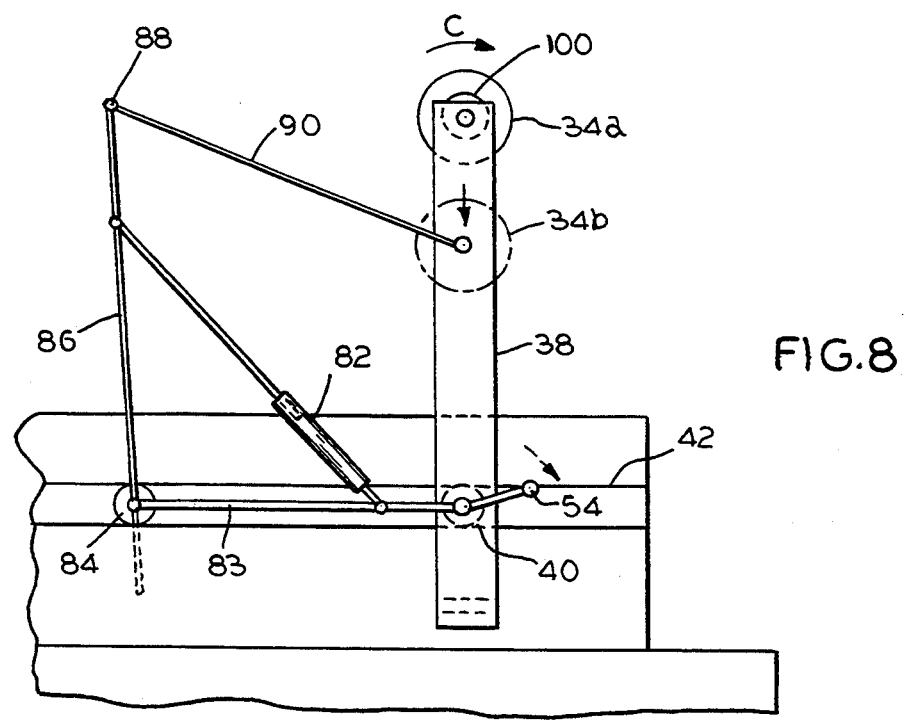

HOLD COVER FOR A VEHICLE ESPECIALLY ONE FOR TRANSPORTING PARTICULATE MATTER

This invention relates to means for and methods of protecting particulate matter—especially, but not exclusively grain—during the storage or transportation thereof and more particularly to weather proof hatch or hold covers especially for barges during the transportation of such particulate matter.

The terms "grain" or "product" and the like, is used herein for convenience of expression and to facilitate a description of the invention. This particular terminology is intended to include all suitable material and is not to be taken as a necessary limitation upon the invention. Likewise, the hold covering may be made of any suitable material, such as plastic sheeting, canvas, or material woven of any suitable thread, or the like. The term "weather proof" is intended to cover a protection against any and all conditions when contaminants may fall through an open and unprotected hatch such as rain, snow, dust, soot, bird dropping, or the like.

Grain is an example of particulate matter which may be transported with the protection provided by the invention. Usually, grain is shipped in the holds of large vehicles such as ships or barges, for example. The hold has an open hatch through which a spout may deliver grain from a silo or other storage device. The open top on this hatch raises problems, especially during inclement weather, dust storms, and the like. After the grain is loaded, it must be transported or stored sometimes over extended periods of time. Therefore, it is necessary to protect the grain in the hold from the rain, snow, dirt, etc., which may fall into the open hatch.

A co-pending application Ser. No. 08/009,121, filed Jan. 26, 1993 (our file 330-740), and assigned to the assignee of this application, shows loading covers for the hold of a barge, for example, during the time period while the barge is being loaded. However, these covers are not suitable for covering the hold while the barge is moving during the transportation of the grain.

More particularly, conventionally, a grain delivery spout system includes a gravity fed pipe, with a relatively large cross sectional area which conveys a flowing stream of grain, or the like, from a source such as a silo. There are many different times and places where such a delivery spout system may be used. However, to explain a particular use of the invention and to highlight the problems of grain movement, it might be assumed that grain is carried by a conveyor belt to an elevated position where it is dumped into a funnel shaped structure, often called a "discharge spout". The grain runs under gravity out the bottom of the funnel or discharge spout and down a delivery spout system to the hold of a ship, barge, or other vehicle. There, the spout swings horizontally or telescopes to scan the hold, spreading the grain uniformly and keeping the vehicle in balance.

Thus, for loading, the hold cover must be large enough to allow the spout to swing and must contain the dust that accompanies the grain loading process. In short, for loading, the hold cover is somewhat like a large tent erected on the deck of the barge or ship. After the loading is complete, the barge, or the vehicle, transports the grain to some distant location. As a practical matter, it would be impossible to move the ship or barge very far with a large tent on its deck. During that transportation, it is necessary to keep the hold covered, which introduces new problems. For example, the cover should be able to go under low bridges.

Heretofore, rigid panels, often fiber glass panels, have covered the top of the hold during transportation. The panels are relatively heavy so that derricks are required to lift and move them, which is time consuming and which usually requires dock side derricks or other similar equipment.

A desirable hold cover would be one which does not require dock side equipment, such as derricks, so that the barge may be loaded and unloaded at locations which are more convenient than the conventional waterfront docks.

A second consideration is that barges, and the like, do not normally have internal power supplies. Therefore, for most operations, the cover should be installed and removed with nothing more than the manual power which may be supplied by one or two men pushing or pulling the cover. If this kind of operation can be provided, it becomes easy to unload the barge at any convenient location.

Accordingly, an object of the invention is to provide new and improved hold covers for transporting grains which may be manually installed and removed by two men. Here, an object is to provide such a cover which may be sealed in place in a weather tight manner.

In keeping with an aspect of the invention, these and other objects are accomplished by mounting a trolley track on opposite sides of a barge coaming. A roller or drum having plastic sheeting or other fabric material wound thereon is mounted to travel along the trolley track. The roller or drum is supported on an end of a telescoping support which may be raised and lowered by a man turning a crank. The front edge of the sheeting is attached to the coaming of the barge in a weather proof manner.

To install the hatch cover, the telescoping support is raised to lift the roll of hatch covering material to an elevated level which is above the top of any product loaded in the hold. On each side of the barge, one man pulls or pushes the trolley toward the opposite end of the barge, paying out the cover as they go. Bungie cords are attached between the edges of the cover and the barge in order to pull the cover into a weather proof sealing contact with the barge coaming. At the distant end of the trolley track, the telescoping support is lowered, pulling the roll in tightly against the barge coaming.

A preferred embodiment and the invention is shown in the attached drawings, in which:

FIG. 1 is a top plan view of a barge with a portion of the hold cover deployed;

FIG. 2 is a side elevation of the barge of FIG. 1;

FIG. 3 is a cross section taken along line 3—3 of FIG. 1;

Figure 9:
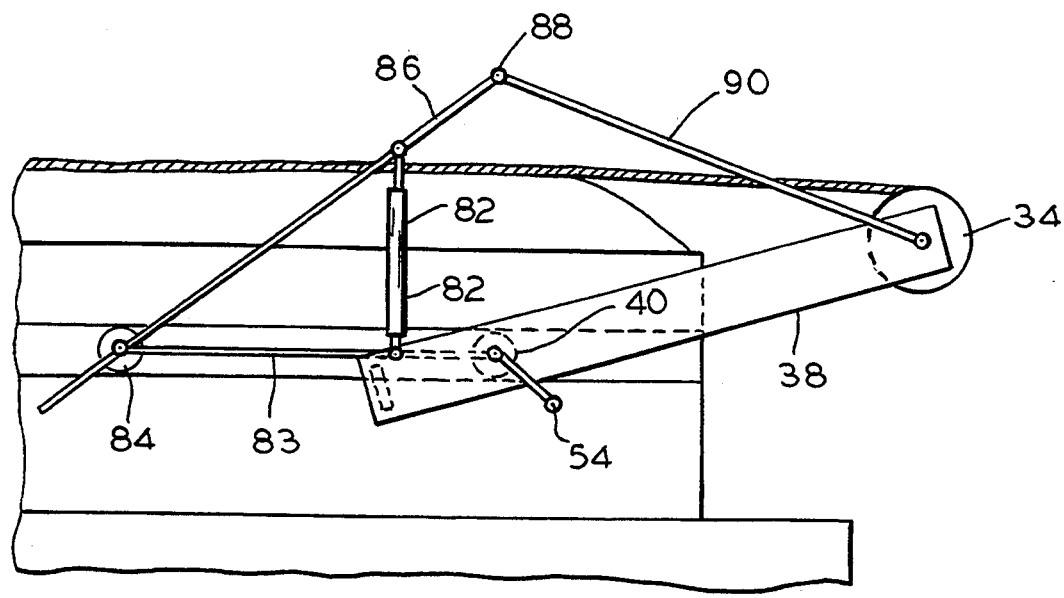
Figure 10:
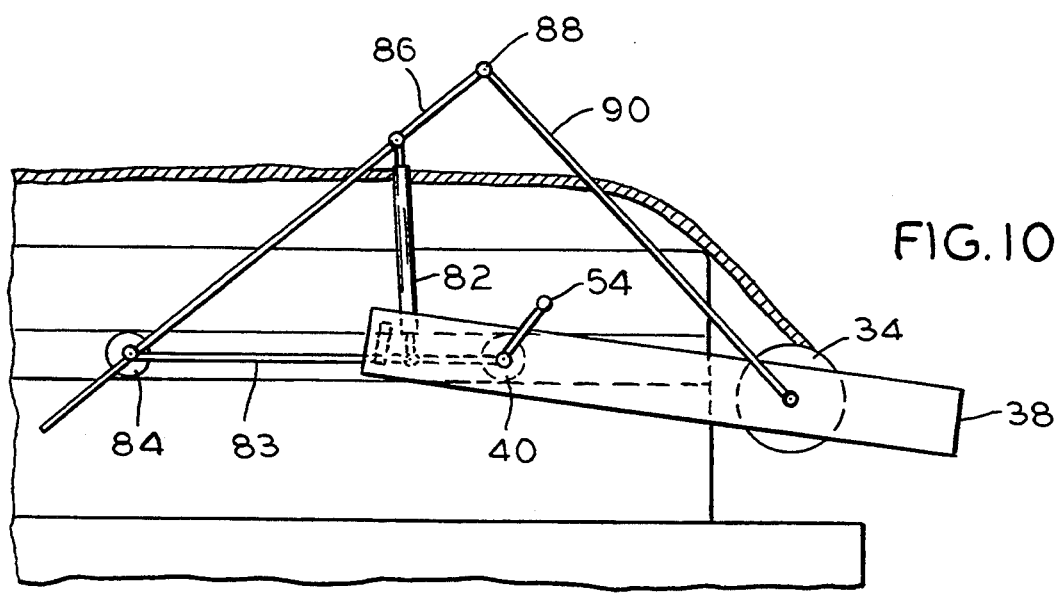
Figure 11:
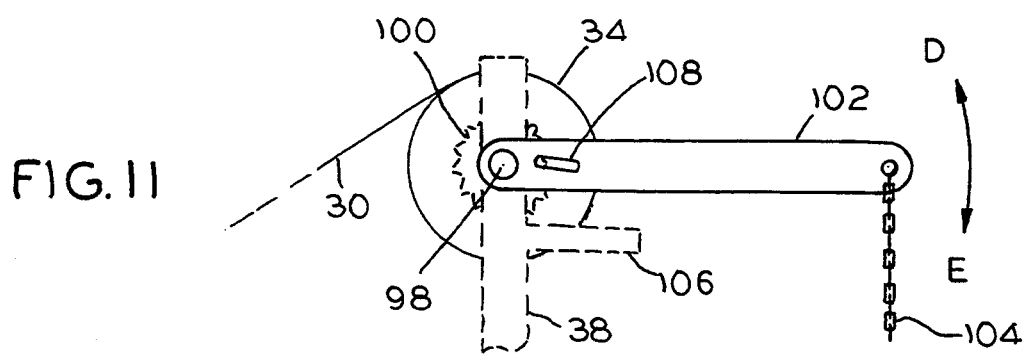

FIG. 4A schematically shows the raising and lowering mechanism for a telescoping roller support;

FIG. 4B shows a fragment of an alternative embodiment of the mechanism of FIG. 4A;

FIG. 5A is a schematic side elevation of the hoisting mechanism taken along line 5—5 of FIG. 4;

FIG. 5B shows a fragment of the alternative embodiment of the mechanism of FIG. 5A;

FIG. 6 shows a side elevation of the barge coaming, the trolley track, and the telescoping support with the roll of the cover material in place;

FIG. 7 shows construction details of the roller mount which is also seen in FIG. 6;

FIG. 8 schematically shows a mechanism for erecting and lowering the telescoping support taken of FIGS. 4 and 5;

FIG. 9 is similar to FIG. 8, showing the telescoping tube in a lowered portion;

FIG. 10 shows the roll being drawn against the coaming with a weatherizing fit; and FIG. 11 shows a detail of the mechanism which unwinds and winds the cover from and onto this roller.

In FIGS. 1 and 2, a barge 20 has a coaming 22, which is, in effect, an upstanding fence around an opening 24 leading to the hold 26. These are standard parts of not only most barges, but also of many other types of vehicles which may transport particulate material, such as grain. As shown at 28 (FIGS. 2 and 3), the particulate material is usually heaped as high as possible, often extending a substantial distance above the top level of the coaming.

The object of the invention is to install and remove a weather proof covering over the top 28 of the heaped particulate material, without requiring any power assisting means so that two men using their own muscle power can manipulate the cover.

The front edge 29 of hatch cover 30 is attached in a weather proof manner to the front end 32 of the coaming 22. The rest of the cover 30 is rolled or wrapped upon a roller 34. As the cover 30 is paid off the roller 34, bungie cords 35 (FIG. 2) are hooked from grommets on the cover 30 to a suitable part of the coaming in order to pull down the edges of the covering against the coaming 22, in a weather proof manner.

On each side of the barge coaming is mounted a steel plate 37 (FIG. 6) having a horizontal trolley track 36 attached thereto, the track extending from one to the other end of the coaming. As best seen in FIG. 5, 3 and 6 the trolley track 36 has a C-shaped cross section with a trolley wheel 40 captured therein. Conveniently, the bungie cords 35 (FIG. 2) may simply be hooked into the C-shaped track 36 after the trolley has moved on.

A telescoping roller support arm 38 is mounted on a trolley having wheels 40 which travel along the track 36, with nothing more than the power of one man on each side of the barge (i.e at A,B FIG. 1) pushing the trolley. A horizontally mounted wheel 44 (FIG. 6) rides on the steel plate 37 attached to the side of the coaming in order to stabilize the vertical position of the telescoping support arm 38. It should be noted from FIG. 3 that the roller 34 is higher than the top 28 of the product in the hold 26. This means that the roller may be moved easily without collision with or dragging over the product surface 28.

The construction of the telescoping support 38 is best seen in FIGS. 4a, 4b, 5a, 5b. An inner steel tube 46 and an outer steel tube 48 are dimensioned to telescope relative to each other. In the inner tube 46 are two spaced parallel sprocket wheels 50, 52, and a take up wheel 53 mounted on a crank arm 54. Therefore, these sprocket wheels and take up reel are rotated in unison by turning the crank 54. Above the sprocket wheels 50, 52 are mating sprocket wheels 56, 58 which are interconnected by individually associated link or roller chains 60, 62. Each of the upper sprocket wheels 56, 58 is individually associated with one or more take up reels 64, 66 on which chains 68, 70 are wound. The far ends of the chains 68, 70 are connected to the bottom edges 72 of the outer tube 48. The reels 64, 66 (FIG. 5A) merely pay out or take up the chains 68, 70 depending on the direction in which crank 54 is turned.

Depending on the direction in which crank 54 turns, the center reel 53 (FIG. 5A) pays out or takes up a roller or link chain 63 which is attached to an upper point 65 on tube 43. Sprocket wheel 59 is an idler. As the telescoping support arm 38 extends, reel 53 pays out the chain 63. As chain 63 is so taken up the outer tube is pulled to one direction. As the support arm 38 retracts, the reel takes up the chain 63 because crank arm 54 turns in an opposite direction.

It should now be apparent that, if crank 54 is turned in one direction, chain 63 is extended while the chains 68, 70 are taken up on the reels 64, 66 in order to extend the telescoping tube, thereby raising the roller from position 34a to position 34b (FIG. 8). If crank 54 is turned in an opposite direction, chain 63 is pulled in and the telescoping tube of support arm 38 is retracted, thereby lowering the cover roller 34 (FIG. 8) from position 34a to position 34b. In both of the embodiments of FIGS. 4A, 5A, and 4B, 5B gravity helps provide the force to retract the support arm 38.

In the alternative embodiment of FIGS. 4B, 5B, the chain 68 runs over a pulley wheel 73 mounted on the inner tube 46. In FIG. 5B, one of the reels 64A, 64B pays out while the other of the reels take up the chains 68, 70 depending upon whether crank 54 is being turned on direction to extend or an opposite direction to retract the support arm. When the telescoping support arm 38 is extended, crank 54 turns in one direction and reel 64A takes up chain 68 to pull point 72 attached to the bottom of the outer tube 48. When crank 54 turns in an opposite direction, reel 64B takes up chain 68 via pulley 73 and positively pulls downwardly on the bottom 72 of the outer tube 48 in order to retract the support arm 38. Thus, by turning the crank 54 in either of two directions, the arm 38 is extended or retracted.

The construction at the top of the telescoping support arm 38 is seen in FIGS. 6, 7. A plate 74 has a stub shaft 76 welded thereto. The plate 74 is bolted at 75, 75 to the top of the outer telescoping support tube 48. The hold cover roller 34 slides over sleeve 77 which is mounted on bearings 78, 80 riding on stub shaft 76. Thus, the roller 34 may be installed by placing the stub shaft 76 and bearing 78, 80 inside the sleeve 77, which in turn is inside roller 34. Then plate 74 is bolted to outer support tube 48. To remove roller 34, the bolts 75, 75 are removed and plate 74 is disassociated from outer tube 48. The roller 34 may be in the order of six inches in diameter.

The roll of hold cover material 30 normally weighs about three-quarters of a ton which means that two men could not lift it. Therefore, a hydraulic ram 82 (FIGS. 8-10) is provided so the weight of the roll of this cover 30 may be lifted or lowered by manually pumping the hydraulic fluid into or out of the ram 82.

In greater detail, a parallelogram frame includes a first link 83 which extends from the trolley wheel 40 to a second trolley wheel 84 riding in the trolley track 42 with the C-shaped cross section. A second link 86 in the parallelogram linkage extends from the trolley wheel 84 to a pivot point 88. A third link 90 in the parallelogram linkage extends from pivot point 88 to the telescoping support 38, which in turn forms the fourth link.

The hydraulic ram 82 extends across approximately a diagonal of the parallelogram in order to erect the telescoping support tube 38 by lengthening the ram. The support arm 38 moves in direction C (FIG. 8) when the hydraulic ram 82 is shortened. The hydraulic ram does not quite reach the corners 88, 40 of the parallelogram linkage.

When hydraulic ram 82 lowers support arm 38, the roller 34 with cover 30 attached to it (FIG. 9) moves out beyond the coaming 22. The crank 54 is preferably turned at a time when the weight of the roll of cover material causes a telescoping of support arm 38 in order to retract and shorten it. As the workmen shorten the hydraulic ram and turn the crank 54, (FIG. 10) the roll 34 of covering material is pulled in against the coaming 22, thereby making a weatherproof seal at the back of the barge. Thus, the shortening of the hydraulic ram 82 and the turning of the crank 54 are coordinated to make the weather tight seal.

Any suitable equipment having a sufficient mechanical advantage may be used to turn the roller 34 in order to pay out or to take up the cover 30 when the hold is covered or uncovered.

In greater detail, FIG. 11 shows a mechanism for unrolling and rolling the cover 30 on roller 34. As a generality, the telescoping support arms 38 hold the axis 98 of roller 34 about nine feet above the deck of the barge during the development or take up of the cover 30. Therefore, it is not practical for a man standing on the deck to turn a crank at the axis of the roller. Moreover, since the full roll of covering material weights about three quarters of a ton, there has to be some mechanical advantage in any winding mechanism if the roll is to be turned by muscle power alone.

As shown in FIGS. 6, 7, 11, a gear 100 is attached to the roller 34 at a location between the support arm 38 and the roller 34 of cover material. An elongated actuator arm 102 is pivotally mounted for upward movement (Direction D) responsive to a suitable spring bias. The length of actuator arm 102 is selected to give a specific mechanical advantage which is adequate of a man to deploy or roll up the cover 30. Attached to the center end of arm 102 is chain 104 which may be pulled to swing arm 102 in direction E as far as stop 106. When the chain 104 is released the spring bias causes actuator arm 102 to return in direction D.

A ratchet mounted on arm 102 (FIG. 11) engages teeth on gear 100 and turn the roller 34 when the chain 104 is pulled. A suitable latch 108 may be moved between two positions. When latch 108 is in one position, a pull on chain 104 turns the roller 34 in a direction which pays out the cover 30. When the latch 108 is moved in another position, a pull on chain 104 turns the roll into an opposite direction to take up the cover 30.

Alternatively the arm 102 may be twice as long as shown in FIG. 11 so that the arm projects to both the left and the right of Axis 98. This way the cover may be unwound by pulling chain 104 on one end of the arm or may be wound by pulling a similar chain on the opposite end of arm 102.

The advantages of the invention should now be apparent. With no external power source, two men may deploy or remove a large hatch cover. Therefore, the loading and unloading time is reduced. Also, the barges may be loaded and unloaded without requiring elaborate dock facilities.

Those who are skilled in the art will readily perceive how to modify the invention. Therefore, the appended claims are to be construed to cover all equivalent structures which fall within the true scope and spirit of the invention.

The claimed invention is:

1. A hold cover and associated deployment mechanism for use on vehicles especially during the storage or transportation of a product, said hold cover and mechanism comprising straight and horizontally oriented tracks adapted to be mounted on opposite sides of said vehicle with a hold for receiving said product between said tracks, said straight tracks adapted to extend linearly along substantially the entire length of said hold on opposite sides of said vehicle, opposing support means mounted on said tracks for movement along each of said tracks, a roller extending between and carried by said opposing support means, a hold cover wound on said roller to be unwound to cover or wound to uncover said hold as said support means moves linerally and longitudinally along said straight horizontal tracks, one end of said cover adapted to be attached to an end of said hold, means for bringing said roller into a weather proof contact with the other end of said hold, and means adapted to be distributed along the length of said hold for securing edges of said cover in a weather proof manner to opposite sides of said hold.

2. The hold cover of claim 1 wherein said support means comprise elevating means for raising said roller to a level above an upper surface of said product heaped in said hold while said cover is being deployed or taken up and for lowering said roller after it is deployed in order to batten down said cover over said product.

3. The hold cover of claim 2 wherein said vehicle is a barge and said hold is surrounded by a coaming, and means adapted for pulling said roller against said coaming at said other end of said hold in order to make said weather proof contact.

4. The hold cover of claim 1, wherein said support means is an elongated telescoping arm, and means effective during deploying or retracting of the cover for extending or retracting said telescoping arm in order to raise said roller above an upper surface of said product heaped in said hold for deploying or taking up said cover and for lowering said roller to enable said cover to lay on said upper surface of said product after said cover is deployed.

5. A hold cover and associated deployment mechanism adapted for use on vehicles especially during the storage or transportation of a product, said hold cover and mechanism comprising horizontally oriented tracks adapted to be mounted on opposite sides of said vehicle with a hold for receiving said product between said tracks, said tracks adapted to extend along the length of said hold on opposite sides of said vehicle, opposing support means mounted on said tracks for movement along each of said tracks, a roller extending between and carried by said opposing support means, a hold cover wound on said roller to be unwound to cover or wound to uncover said hold as said support means moves along said tracks, one end of said cover being adapted to be attached to an end of said hold, means for bringing said roller into a weather proof contact with the other end of said hold, said support means being an elongated telescoping arm having said roller mounted on one end thereof, the other end of said arm being adapted to be pivotedly attached to said vehicle, means for extending or retracting said telescoping arm during deploying or retracting of the cover in order to raise said roller above an upper surface of said product heaped in said hold for deploying or taking up said cover and for lowering said roller to enable said cover to lay on said upper surface after said cover is deployed, said support means further comprising a hydraulic ram for swinging said arm on said pivot in order to erect or lower said support arm during said deploying or retracting of the cover, and means distributed along the length of said hold for securing edges of said cover in a weather proof manner to opposite sides of said hold.

6. The hold cover of claim 5 wherein said vehicle is a barge with said hold having a coaming surrounding said hold, and a parallelogram linkage, said hydraulic ram being connected to said parallelogram linkage to raise or lower said roller over said coaming at said other end of said hold.

7. A barge cover mechanism, said barge having an elongated hold surrounded by a coaming, said mechanism comprising a trolley track adapted to be mounted on each side of said hold, said trolley track being adapted to be attached to and extend along substantially an entire length of said coaming, a trolley for each side of said hold, said trolley being mounted for movement along the length of said track, an elongated support arm for each side of said hold, each of said arms being pivotally mounted on an individually associated trolley to swing between substantially vertical and substantially horizontal positions, a roller extending across said hold and being mounted on said elongated support arms whereby said roller is raised or lowered by swinging said arms between said vertical and horizontal position, said roller having a hold cover wound thereon, and means for deploying or taking up said hold cover while said trolley is moving along said track.

8. The barge cover mechanism of claim 7 and means for telescoping said elongated support arms in order to further extend or retract said support arms in either the vertical or the horizontal positions.

9. The barge cover mechanism of claim 8 and telescoping means further comprising a hydraulic ram for moving said support arms between said vertical and horizontal positions.

10. The barge cover mechanism of claim 9 and a parallelogram linkage having said trolley as one link and said support arm as another link of said parallelogram linkage, said hydraulic ram being connected to said parallelogram linkage for moving said roller beyond an end of said coaming after said cover is deployed, and said telescoping means drawing said roller in tightly against said coaming after said cover is deployed in order to form a weather proof seal.

11. The barge cover mechanism of claim 10 wherein said support arms telescope to raise or lower said roller in addition to each of said arms being mounted to swing between said substantially vertical and substantially horizontal positions, whereby said parallelogram linkage may swing said roller on said coaming and said telescoping arm may be retracted to pull said roller in to a weather proof seal against said coaming.

12. The barge cover mechanism of claim 7 wherein said means for deploying or taking up said hold cover comprises a gear assembly mounted on said roller, a lever arm having a ratchet for turning said gear with a mechanical advantage provided by the length of said lever arm, and means for adjusting said ratchet to turn said roller in a selected direction in order to deploy or take up said cover.

13. A barge having a hold surrounded by a coaming; a roll of sheeting cover material means movably mounted for travel along said barge over an entire length of said hold; and manually operably means for deploying said sheeting cover from said roll and over said hold, and bring said roll into a tight weather proof sealing contact against one end of said coaming, or taking up said cover and wrapping it on said roll on an opposite end of said coaming; and tracks on said barge which extend along the length of said hold, said roll being mounted on a trolley which travels over said tracks, a hydraulic ram mounted on said trolley for raising or lowering said roll, and telescoping means for further raising or lowering said roll, whereby said hydraulic ram may lower said roll and said telescoping means may pull said roll into said weather proof sealing contact against said coaming.

14. The barge hold of claim 13 and lever means for turning said roll in either of two directions to deploy or to take up said sheeting cover material.

* * * * *